UNITED STATES PATENT OFFICE.

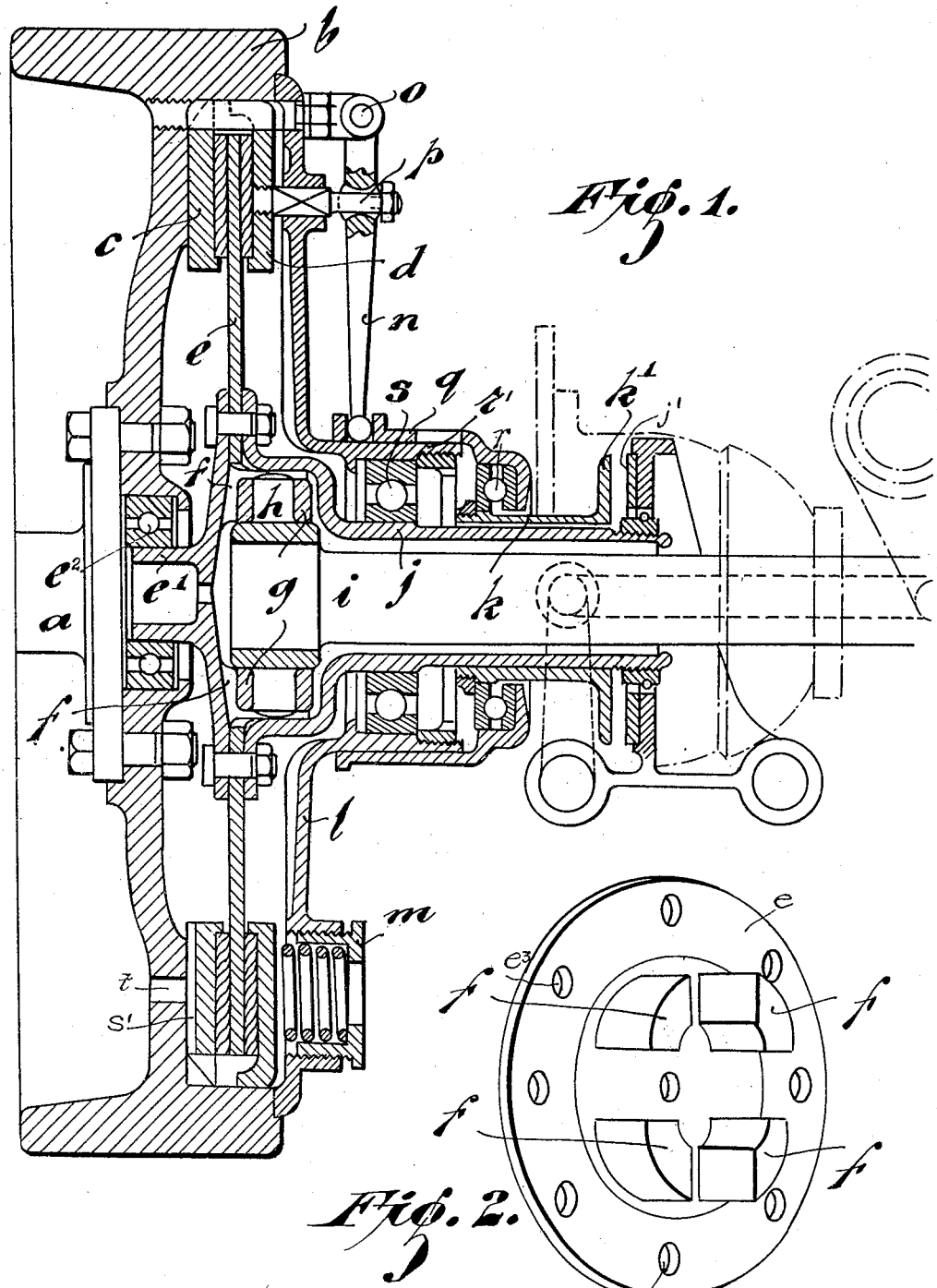

GEORGE EDWARD DURSTON RALLS, OF BIRMINGHAM, ENGLAND.

CLUTCH AND TRANSMISSION MECHANISM FOR MOTOR ROAD AND OTHER VEHICLES.

1,338,252.　　　　　Specification of Letters Patent.　　Patented Apr. 27, 1920.

Application filed April 18, 1918. Serial No. 229,403.

*To all whom it may concern:*

Be it known that I, GEORGE EDWARD DURSTON RALLS, a subject of the Kingdom of Great Britain, residing at 314 Bradford street, Birmingham, Warwickshire, England, have invented Improvements in or Relating to Clutch and Transmission Mechanism for Motor Road and other Vehicles, of which the following is a specification.

This invention comprises certain improvements in or relating to clutch and transmission mechanism for motor road and other vehicles.

According to the present invention I provide in conjunction with a clutch involving a plate on one shaft section adapted to be gripped between plates or the equivalent appertaining to the other shaft section, a universal coupling incorporated in or substantially in the plane of the clutch, such universal coupling involving provision permitting of a relative axial movement of the parts of the coupling.

I also incorporate provision for releasing the clutch, according to which all three of the clutch elements are adapted to be positively separated from each other, for which purpose the intermediate plate of the clutch is adapted to be axially displaced.

In order that this invention may be clearly understood and readily carried into practice, reference may be had to the appended explanatory sheet of drawings, upon which:—

Figure 1 is a sectional elevation of a clutch mechanism according to the present invention.

Fig. 2 illustrates in perspective a detail of the mechanism shown in Fig. 1.

In a convenient embodiment of the present invention, the driving shaft $a$ has secured to it a fly-wheel $b$, which carries two rings $c, d$, one $d$ of which is adapted to move axially in relation to the other, which rings are provided with appropriate clutch facings of fibrous or other material, and between which rings a plate $e$ constituting the driven member of the clutch is adapted to be gripped. This plate has a boss $e^1$, between which and the fly-wheel $b$ a ball bearing $e^2$ is incorporated, and the said plate also carries four segment-shaped lugs $f$, between which blocks $g$ are incorporated. The said blocks are perforated and assembled upon radially projecting bosses or studs $h$ of a star end, with which the driven shaft $i$ is furnished, so that a slight angular and axial displacement of the driven shaft in relation to the driving shaft is thereby rendered permissible and hence a universal coupling is formed between the driving and driven shafts. Extending from the driven clutch plate in a direction away from the fly-wheel is a sleeve $j$. This sleeve is enlarged at its one extremity to inclose the universal coupling, and confine the lubricating oil applied thereto. Around this sleeve a second sleeve $k$ hereinafter called the clutch operating sleeve is adapted to slide. This clutch operating sleeve is keyed to the sleeve $j$ of the driven clutch element, and it is furnished at its one end with a flange $k^1$ by which it is adapted to be displaced axially by any suitable mechanism.

The clutch plates are inclosed by a closure member $l$ combined with the fly-wheel $b$, and which closure member at each of a series of, say, three radii, is furnished with a cup member $m$ adapted to contain a coiled spring which bears upon the clutch plate $d$. This cup member $m$ is screwed into the closure member, and thus by simply manipulating the said cup member the effort of the springs can be adjusted.

At a suitable number, say, three, of radii intermediate to the said cup members $m$ in which the springs are incorporated, radially disposed levers $n$ are incorporated externally of the closure member $l$. These levers $n$ are pivoted at their outermost extremities $o$; at an intermediate position $p$ they are appropriately coupled to the plate clutch member $l$ appertaining to the fly-wheel, and at their inner extremities they are engaged by a sleeve $q$ adapted to be displaced axially by the clutch operating sleeve $k$, between which latter and the sleeve $q$ with which the radial levers coöperate, an anti-friction bearing $r$ is incorporated. By axially displacing the clutch operating sleeve $k$, the outer clutch plate is thus displaced axially against the resistance of the coiled springs. After the clutch operating sleeve $k$ has received a certain degree of movement, it is adapted to engage with a projection or enlargement $j'$ upon the sleeve $j$, which is secured to the driven plate member of the clutch so that this plate member is also displaced axially to disengage it from the third member $c$ of the clutch which is incapable of axial movement in relation to the fly-wheel.

This closure member which is secured to the fly-wheel to inclose the clutch plates may be furnished with a boss or sleeve-like extension $r'$, between which and the sleeve appertaining to the driven plate clutch member a ball bearing $s$ may be incorporated.

Apertures are provided in the closure member $l$ which is combined with the fly-wheel; said apertures may, for instance, be provided in the cup members $m$ adapted to contain the coiled springs which bear upon the clutch plates. Apertures $e^3$ are also provided in the intermediate clutch plate, and between the clutch ring which is adjacent to the web of the fly-wheel and said web of the fly-wheel, air circulation grooves $s'$ are incorporated; these air circulation grooves may communicate with apertures $t$ passing through the web of the fly-wheel.

What I claim as my invention and desire to secure by Letters Patent is:—

The combination of a pair of shafts arranged end to end, a pair of concentrically arranged axially movable sleeves on one of said shafts, an intermediate plate secured to the inner of said sleeves, a pair of friction members revoluble with the other shaft and arranged on opposite sides of the intermediate plate, one of said members being movable toward and from said plate, and means operated by the outer of the concentric sleeves to displace said last named member, said sleeves being constructed and arranged to cause the inner sleeve, together with the intermediate plate, to be displaced by the outer sleeve after the latter has been displaced and has caused the last named friction member to be displaced from said intermediate plate.

In witness whereof I have hereunto set my hand in the presence of two witnesses.

GEORGE EDWARD DURSTON RALLS.

Witnesses:
ARTHUR H. BROWN,
EDGAR N. WHEELER.